(12) United States Patent
Nishiyama et al.

(10) Patent No.: US 9,576,392 B2
(45) Date of Patent: Feb. 21, 2017

(54) IMAGE DISPLAY DEVICE AND METHOD, AND MEDIUM CONTAINING PROGRAM

(71) Applicant: FUJIFILM Corporation, Tokyo (JP)

(72) Inventors: Yukinori Nishiyama, Tokyo (JP); Mikako Kobayashi, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/630,384

(22) Filed: Feb. 24, 2015

(65) Prior Publication Data
US 2015/0243055 A1    Aug. 27, 2015

(30) Foreign Application Priority Data

Feb. 27, 2014  (JP) ................................. 2014-036659

(51) Int. Cl.
G06K 9/00 (2006.01)
G06T 15/08 (2011.01)
G06T 19/20 (2011.01)

(52) U.S. Cl.
CPC ............... *G06T 15/08* (2013.01); *G06T 19/20* (2013.01); *G06T 2219/028* (2013.01)

(58) Field of Classification Search
CPC ................................. G06T 19/20; G06T 15/08
See application file for complete search history.

(56) References Cited

U.S. PATENT DOCUMENTS 8,610,746 B2 * 12/2013 Fram .................... A61B 6/5223
                                                          345/661
2006/0062425 A1 * 3/2006 Shen ..................... G06T 7/0081
                                                          382/100
(Continued)

FOREIGN PATENT DOCUMENTS

JP    H 08-77329 A    3/1996
JP    2003-010171 A    1/2003
(Continued)

OTHER PUBLICATIONS

Carstensen et al (NPL "SPECT/CT imaging of the lumbar spine in chronic low back pain: a case report" Chiropractic & Manual Therapies 2011, 19:2, p. 5).*

(Continued)

*Primary Examiner* — Oneal R Mistry
(74) *Attorney, Agent, or Firm* — McGinn IP Law Group, PLLC.

(57) ABSTRACT

A two-dimensional image is generated from a three-dimensional volume image of the chest of a human body based on information about recognized and labeled costal regions and vertebral regions. The two-dimensional image includes first regions showing one of right and left costal regions and second regions showing the other of the right and left costal regions or vertebral regions. Different colors or patterns are applied to the first regions showing different ones of the costal regions, and the same color or pattern as that of each first region is applied to the second region that shows a costal region provided with a label indicating a costal bone located on the opposite side of and paired with the costal bone shown by the first region or a vertebral region provided with a label indicating a vertebral bone connected to the costal bone shown by the first region.

14 Claims, 6 Drawing Sheets

(56) References Cited

U.S. PATENT DOCUMENTS

| | | | |
|---|---|---|---|
| 2007/0110295 A1* | 5/2007 | Shen | G06T 7/0012 |
| | | | 382/131 |
| 2007/0258632 A1 | 11/2007 | Friedman et al. | |
| 2009/0262998 A1 | 10/2009 | Wang et al. | |
| 2010/0150418 A1 | 6/2010 | Moriya et al. | |
| 2012/0106810 A1* | 5/2012 | Ramakrishnan | G06T 7/0042 |
| | | | 382/128 |
| 2012/0172700 A1* | 7/2012 | Krishnan | A61B 6/032 |
| | | | 600/407 |

FOREIGN PATENT DOCUMENTS

| | | |
|---|---|---|
| JP | 2007-296335 A | 11/2007 |
| JP | 2009-240569 A | 10/2009 |
| JP | 2009-254600 A | 11/2009 |
| JP | 2010-162340 A | 7/2010 |
| JP | 2012-192118 A | 10/2012 |
| JP | 2013-052121 A | 3/2013 |

OTHER PUBLICATIONS

Japanese Office Action dated Feb. 9, 2016 with an English translation thereof.
Japanese Office Action dated Oct. 4, 2016 with an English translation thereof.

* cited by examiner

IMAGE DISPLAY DEVICE AND METHOD, AND MEDIUM CONTAINING PROGRAM

CROSS-REFERENCE TO RELATED APPLICATIONS

The present application claims priority under 35 U.S.C. §119 to Japanese Patent Application No. 2014-036659, filed on Feb. 27, 2014. The above application is hereby expressly incorporated by reference, in its entirety, into the present application.

BACKGROUND OF THE INVENTION

Field of the Invention

The present invention relates to an image display device, an image display method, and an image display program for generating, from a three-dimensional volume image obtained by imaging a chest, an image that shows results of recognition of a plurality of costal regions on one of right and left sides, and a plurality of costal regions on the other of the right and left sides or a plurality of vertebral regions, and displaying the generated image.

Description of the Related Art

A process to automatically recognize costal regions and vertebral regions in a three-dimensional volume image obtained by imaging a chest and assign labels, such as bone numbers, to the recognized regions is conventionally performed. Further, a technique to display information, such as a bone number, in the vicinity of each of recognized costal regions and vertebral regions, as shown in FIG. 10, for example, is proposed in each of Japanese Unexamined Patent Publication Nos. 2009-254600 and 2009-240569 (hereinafter, Patent Documents 1 and 2, respectively).

SUMMARY OF THE INVENTION

Results of the above-described region recognition are not always accurate, and it is necessary to check for and correct errors in the results of recognition. However, with the image obtained according to the method taught in each of Patent Documents 1 and 2, where simply information, such as bone numbers, are displayed in the vicinity of the costal regions and the vertebral regions, it is difficult to find errors, if any, in the results of recognition. For example, FIG. 10 shows an image where all the costal regions and vertebral regions are accurately recognized, whereas FIG. 11 shows an image where the first costal region from above on the left side is failed to be recognized, and the second to the tenth costal regions from above are erroneously recognized as the costal regions of the bone numbers 1 to 9. Finding these errors in the image shown in FIG. 11 requires significant effort and time, such as comparing the bone numbers and the regions shown in the image with one another.

In view of the above-described circumstances, the present invention is directed to providing an image display device, an image display method, and an image display program for generating and displaying an image that facilitates determining if there is any error in the results of recognition of costal regions, etc.

A first aspect of the image display device of the invention comprises: an image obtaining unit for obtaining a three-dimensional volume image obtained by imaging a chest of a human body; an information obtaining unit for obtaining information about costal regions on one of right and left sides of the human body in the three-dimensional volume image, and costal regions on the other of the right and left sides of the human body or vertebral regions of the human body in the three-dimensional volume image, the costal regions and the vertebral regions having been recognized and labeled in the three-dimensional volume image; an image generation unit for generating a display image from the three-dimensional volume image using the obtained information, the display image being a two-dimensional image including first partial regions that show at least a part of at least two of the costal regions on the one of the right and left sides, and second partial regions that show at least a part of at least two of the costal regions on the other of the right and left sides or at least two of the vertebral regions, wherein different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; a display unit for displaying an image; and a display control unit for displaying the generated display image on the display unit.

A second aspect of the image display device of the invention comprises: an image obtaining unit for obtaining a three-dimensional volume image obtained by imaging a chest of a human body; an information obtaining unit for obtaining information about costal regions on one of right and left sides of the human body in the three-dimensional volume image, and costal regions on the other of the right and left sides of the human body or vertebral regions of the human body in the three-dimensional volume image, the costal regions and the vertebral regions having been recognized and labeled in the three-dimensional volume image; an image generation unit for generating a plurality of tomographic images from the three-dimensional volume image, the tomographic images being sequential in an arbitrarily-set direction, wherein the same color or pattern is applied to corresponding partial regions that show a costal region or a vertebral region provided with the same label, the tomographic images as a whole includes first partial regions that show at least a part of at least two of the costal regions on the one of the right and left sides, and second partial regions that show at least a part of at least two of the costal regions on the other of the right and left sides or at least two of the vertebral regions, different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; a display unit for displaying an image; and a display control unit for sequentially changing a tomographic image displayed on the display unit among the generated tomographic images in response to input of an operator's instruction to sequentially change the displayed tomographic image.

Generating an image wherein the color or pattern is applied to the partial region that shows a costal region on the opposite side (the other of the right and left sides) or a vertebral region means that the color or pattern is applied to one of the partial region that shows the costal region on the opposite side and the partial region that shows the vertebral region when the one of the partial region that shows the costal region on the opposite side and the partial region that shows the vertebral region is included in the generated image, or the color or pattern is applied to at least one of the partial region that shows the costal region on the opposite side and the partial region that shows the vertebral region when both the partial region that shows the costal region on the opposite side and the partial region that shows the vertebral region are included in the generated image.

Applying the color or pattern to a specific region means that at least a part of the region is filled with the color or pattern. It may be preferred that the extent of the part filled with the color or pattern be determined such that the user seeing the display can generally understand the position of the entire specific region according to the color or pattern. In the first and second aspects of the image display device of the invention, the image generation unit may perform, as an operation to apply the color or pattern to a specific region, one of filling the entire specific region with the color or pattern, filling only a center portion of the specific region resulting from thinning of the specific region with the color or pattern, and filling only a peripheral edge portion of the specific region with the color or pattern.

In the first aspect of the image display device of the invention, the image generation unit may generate the display image wherein the second partial regions include the second partial regions that show at least a part of at least two of the costal regions on the other of the right and left sides and the second partial regions that show at least a part of at least two of the vertebral regions, wherein the same color or pattern as that of each first partial region is applied to the second partial region that shows a costal region provided with a label indicating a costal bone located on the opposite side of and paired with the costal bone shown by the first partial region and the second partial region that shows a vertebral region provided with a label indicating a vertebral bone connected to the costal bone shown by the first partial region.

In the first aspect of the image display device of the invention, the image generation unit may generate the display image that is a projection image generated by projecting regions in an arbitrarily-set projection direction in the three-dimensional volume image, each region having a thickness in the projection direction, wherein the colors or patterns are applied to the first and the second partial regions. In this case, the image generation unit may generate the projection image by projecting, in the front-back direction of the human body, the regions in the rear half of the human body in the three-dimensional volume image.

In the first aspect of the image display device of the invention, said display image may be the first display image, and the image generation unit may generate, in addition to the first display image, at least one second display image that is a two-dimensional image from the three-dimensional volume image, wherein, in both the at least one second display image and the first display image, the same color or pattern is applied to corresponding partial regions that show a costal region or a vertebral region provided with the same label in the three-dimensional volume image, and the display control unit displays the at least one second display image and the first display image on the display unit.

In the first aspect of the image display device of the invention, if the regions to be projected in the three-dimensional volume image include regions provided with labels and having an overlapping area therebetween when viewed in the projection direction, the image generation unit may apply, to an area in the display image corresponding to the overlapping area, the color or pattern applied to the region nearest to a view point among the regions provided with labels and having the overlapping area therebetween.

In the first aspect of the image display device of the invention, if the regions to be projected in the three-dimensional volume image include regions provided with labels and having an overlapping area therebetween when viewed in the projection direction, the image generation unit may apply, to an area in the display image corresponding to the overlapping area, a color or pattern that is a weighted mixture of the colors or patterns applied to the regions provided with labels and having the overlapping area therebetween.

In the first and the second aspects of the image display device of the invention, the image generation unit may generate, using the obtained information, the display image wherein a character string representing the label assigned to each partial region is shown in the vicinity of corresponding one of the first and the second partial regions with the color or pattern applied thereto.

In the first and the second aspects of the image display device of the invention, the image generation unit may generate, in response to input of an operator's selection of one of the partial regions with the colors or patterns applied thereto in the display image displayed on the display unit, a highlighted image wherein the color or pattern applied to the selected partial region is more highlighted than the colors or patterns applied to the other partial regions, and the display control unit may display the thus generated highlighted image on the display unit.

A first aspect of the image display method of the invention is an image display method performed by an image display device including an image obtaining unit, an information obtaining unit, an image generation unit, a display unit, and a display control unit, wherein: the image obtaining unit obtains a three-dimensional volume image obtained by imaging a chest of a human body; the information obtaining unit obtains information about costal regions on one of right and left sides of the human body in the three-dimensional volume image, and costal regions on the other of the right and left sides of the human body or vertebral regions of the human body in the three-dimensional volume image, the costal regions and the vertebral regions having been recognized and labeled in the three-dimensional volume image; the image generation unit generates a display image from the three-dimensional volume image using the obtained information, the display image being a two-dimensional image including first partial regions that show at least a part of at least two of the costal regions on the one of the right and left sides, and second partial regions that show at least a part of at least two of the costal regions on the other of the right and left sides or at least two of the vertebral regions, wherein different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; and the display control unit displays the generated display image on the display unit.

A second aspect of the image display method of the invention is an image display method performed by an image display device including an image obtaining unit, an information obtaining unit, an image generation unit, a display unit, and a display control unit, wherein: the image obtaining unit obtains a three-dimensional volume image obtained by imaging a chest of a human body; the information obtaining unit obtains information about costal regions on one of right and left sides of the human body in the three-dimensional volume image, and costal regions on the other of the right and left sides of the human body or vertebral regions of the human body in the three-dimensional volume image, the costal regions and the vertebral regions having been recognized and labeled in the three-dimensional volume image; the image generation unit generates a plurality of tomographic images from the three-dimensional volume image, the tomographic images being sequential in an arbitrarily-set direction, wherein the same color or pattern is applied to corresponding partial regions that show a costal region or a vertebral region provided with the same label, the tomographic images as a whole includes first partial regions that show at least a part of at least two of the costal regions on the one of the right and left sides, and second partial regions that show at least a part of at least two of the costal regions on the other of the right and left sides or at least two of the vertebral regions, different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; and the display control unit sequentially changes a tomographic image displayed on the display unit among the generated tomographic images in response to input of an operator's instruction to sequentially change the displayed tomographic image.

First and second aspects of the image display program of the invention cause a computer to function as the above-described first and second aspects of the image display device, respectively. Each of the first and the second aspects of the image display program of the invention typically includes a plurality of program modules, and the above-described function of each unit is implemented by one or more program modules. The group of program modules is recorded on a recording medium, such as a CD-ROM or DVD, or recorded in a downloadable state in a storage of a server computer or a network storage to be provided to the user.

According to the first aspect of the image display device, the image display method, and the image display program of the invention: a three-dimensional volume image obtained by imaging the chest of a human body is obtained; information about costal regions on one of right and left sides of the human body in the three-dimensional volume image, and costal regions on the other of the right and left sides of the human body or vertebral regions of the human body in the three-dimensional volume image is obtained, the costal regions and the vertebral regions having been recognized and labeled in the three-dimensional volume image; a display image is generated from the three-dimensional volume image using the obtained information, the display image being a two-dimensional image including first partial regions that show at least a part of at least two of the costal regions on the one of the right and left sides, and second partial regions that show at least a part of at least two of the costal regions on the other of the right and left sides or at least two of the vertebral regions, wherein different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; and the thus generated display image is displayed on a display unit. The above-described invention can provide an image that facilitates determining if there is any error in the results of recognition of costal regions, etc.

Specifically, in an image including the costal regions on the one of the right and left sides and the costal regions on the opposite side that are respectively paired with the costal regions on the one side where the same color or pattern is applied to each pair of costal regions, accurate determination as to if there is any error in the result of recognition can be achieved by checking the symmetry of the regions having the same color or pattern. For example, in the image shown in FIG. 12, where the costal regions and the vertebral region are accurately recognized, the sets of regions having the same color or pattern are symmetrically arranged. In contrast, in the image shown in FIG. 13, which shows a case where the first costal region from above on the left side in the image is failed to be recognized, and the second to the tenth costal regions from above are erroneously recognized as the costal regions of the bone numbers 1 to 9, the sets of regions having the same color or pattern are not symmetrical, and thus the user can easily notice the errors in the results of recognition. Further, with an image that includes the vertebral regions respectively connected to the costal regions on the one of the right and left sides where the same color or pattern is applied to each set of the costal region and the vertebral region, determination as to if there is any error in the results of recognition can easily be achieved by checking the continuity of the regions having the same color or pattern.

According to the second aspect the image display device, the image display method, and the image display program of the invention, a three-dimensional volume image obtained by imaging the chest of a human body is obtained; information about costal regions on one of right and left sides of the human body in the three-dimensional volume image, and costal regions on the other of the right and left sides of the human body or vertebral regions of the human body in the three-dimensional volume image is obtained, the costal regions and the vertebral regions having been recognized and labeled in the three-dimensional volume image; a plurality of tomographic images are generated from the three-dimensional volume image, the tomographic images being sequential in an arbitrarily-set direction, wherein the same color or pattern is applied to corresponding partial regions that show a costal region or a vertebral region provided with the same label, the tomographic images as a whole includes first partial regions that show at least a part of at least two of the costal regions on the one of the right and left sides, and second partial regions that show at least a part of at least two of the costal regions on the other of the right and left sides or at least two of the vertebral regions, different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; and a tomographic image displayed on the display unit among the thus generated tomographic images is sequentially changed in response to input of an operator's instruction to sequentially change the displayed tomographic image. With the above-described image display, a person who interprets the image, such as a doctor, seeing the display can easily determine if there is any error in the results of recognition of costal regions, etc., by checking the continuity of the regions having the same color or pattern shown in the sequentially displayed images.

DESCRIPTION OF THE PREFERRED EMBODIMENTS

Figure 1:
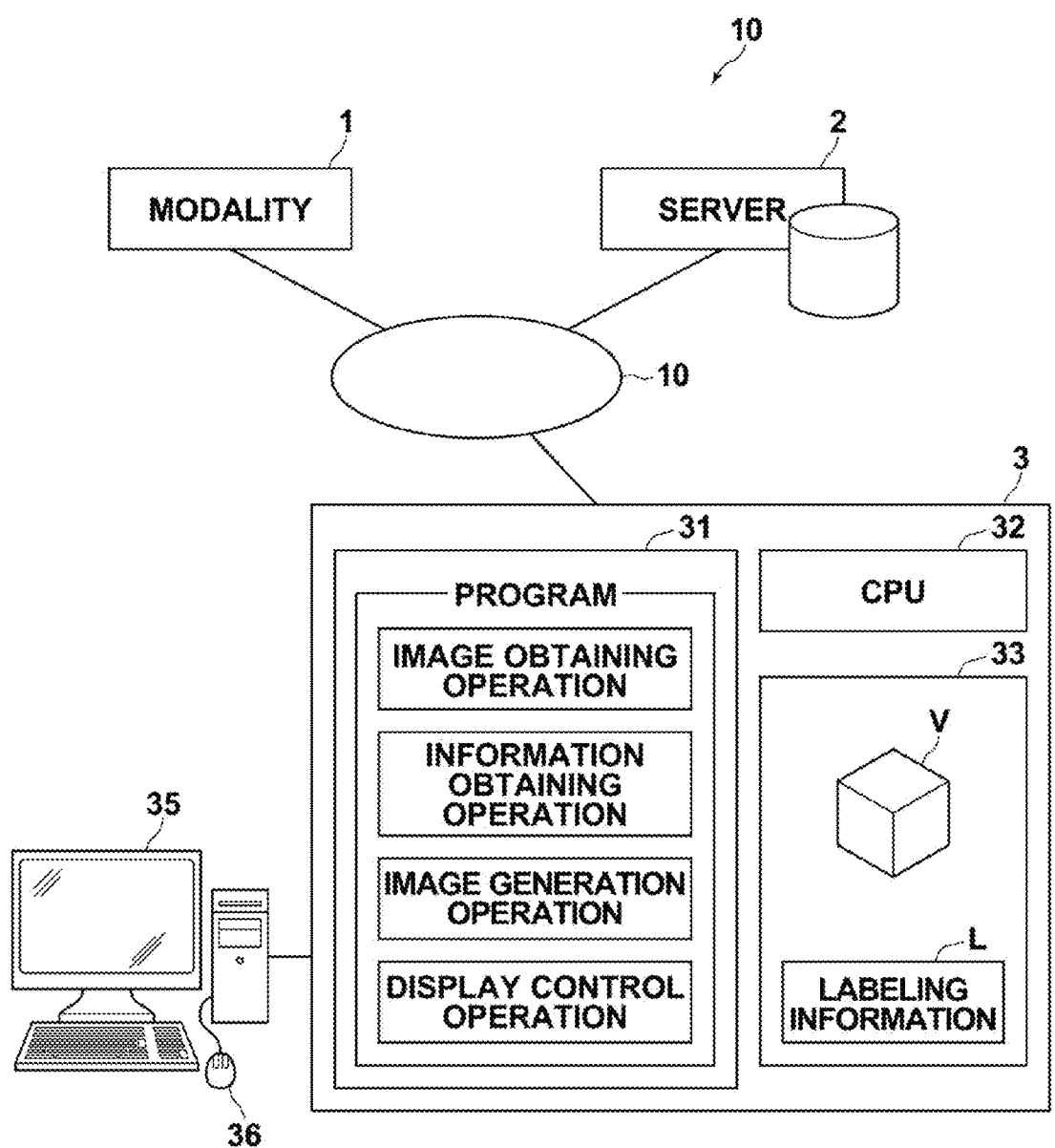
FIG. 1 is a diagram illustrating the schematic configuration of an image processing system.

Hereinafter, one embodiment of the present invention will be described with reference to the drawings. FIG. 1 is a diagram illustrating the schematic hardware configuration of an image processing system 10. As shown in the drawing, this system includes a modality 1, a server 2, and an image display device 3, which are connected via a network 9 such that they can communicate with each other.

The modality 1 images a subject and generates an image showing the subject. Specific examples of the modality 1 include a CT (Computed Tomography) apparatus, a MRI (Magnetic Resonance Imaging) apparatus, a PET (Positron Emission Tomography) apparatus, an ultrasound imaging apparatus, etc.

The server 2 is a computer that stores and manages data, such as images generated by the modality 1 and information obtained by analyzing the images, in a database. In response to a request from the image display device 3, the server 2 extracts, from the database, data that meets the request and feeds the data. It should be noted that, in this embodiment, a three-dimensional volume image V that is obtained by imaging at least the chest of a human body, and information L about costal regions, vertebral regions, etc., which have been recognized and labeled in the three-dimensional volume image are stored and managed in the database.

The information L about the recognize and labeled costal regions, vertebral regions, etc., are identification information that are assigned to the individual bone regions based on the size, the shape, relative positional relationship, etc., of each of the costal regions and vertebral regions detected from the three-dimensional volume image V. The identification information may be an anatomical name (such as "the n-th left costal bone", "the n-th right costal bone", "the n-th thoracic vertebra", etc.) of the bone shown by each bone region, or any numbers assigned to the individual bone regions to indicate relative positional relationships among the bone regions in the three-dimensional volume image V. It should be noted that, in the case where the information in the form of numbers are assigned to the individual bone regions, it is at least necessary that a correspondence relationship between each pair of left and right costal regions, or a connection relationship between each costal region on one of the right and left sides and the corresponding vertebral region can be derived from the assigned numbers. For example, in a case where the three-dimensional volume image V only shows the 4th to the 6th costal bone pairs among the twelve pairs of left and right costal bones and the vertebral bones connecting the 4th to the 6th costal bone pairs, the costal bones on the left in the image may be labeled as the 1st left costal bone, the 2nd left costal bone, the 3rd left costal bone, . . . , from above, the costal bone on the opposite side of each n-th left costal bone may be labeled as the n-th right costal bone, and the vertebral bone connecting each pair of the n-th left and right costal bones may be labeled as the n-th vertebral bone.

The image display device 3 is a computer that obtains a specified three-dimensional volume image V from the server 2 in response to input of an operator's instruction to display an image, generates one or more display images from the three-dimensional volume image V, and displays the generated images. The image display device 3 includes a memory 31, a CPU 32, and a storage 33. Further, a display unit 35, such as a display, and an input unit 36, such as a mouse, are connected to the image display device 3.

Figure 2:
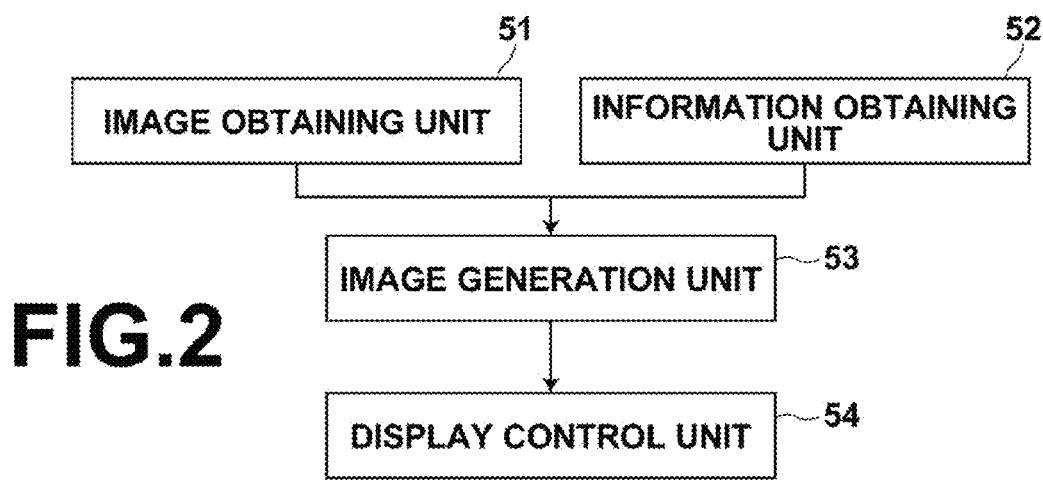
FIG. 2 is a block diagram illustrating the functional configuration of the image display device.

When the image display device 3 is started up, an image display program and data reference by the program, which are stored in the storage 33, are load into the memory 31. The image display program defines, as operations executed by the CPU 32, an image obtaining operation, an information obtaining operation, an image generation operation, and a display control operation. When the CPU 32 executes the operations of the program loaded in the memory 31, the computer functions as an image obtaining unit 51, an information obtaining unit 52, an image generation unit 53, and a display control unit 54, as shown in FIG. 2. FIG. 2 is a schematic block diagram of the functions implemented as the image display device 3.

Next, an operation performed by the image display device 3 to generate one or more display images from the three-dimensional volume image V and display the generated images is described. First, in response to input of operator's instruction to display a specified three-dimensional volume image V, the image obtaining unit 51 obtains the specified three-dimensional volume image V from the server 2 and stores the obtained image in the storage 33. Then, the information obtaining unit 52 obtains, from the server 2, the information L about costal regions, vertebral regions, etc., which have been recognized and labeled in the specified three-dimensional volume image V, and stores the information L in the storage 33.

Figure 3:
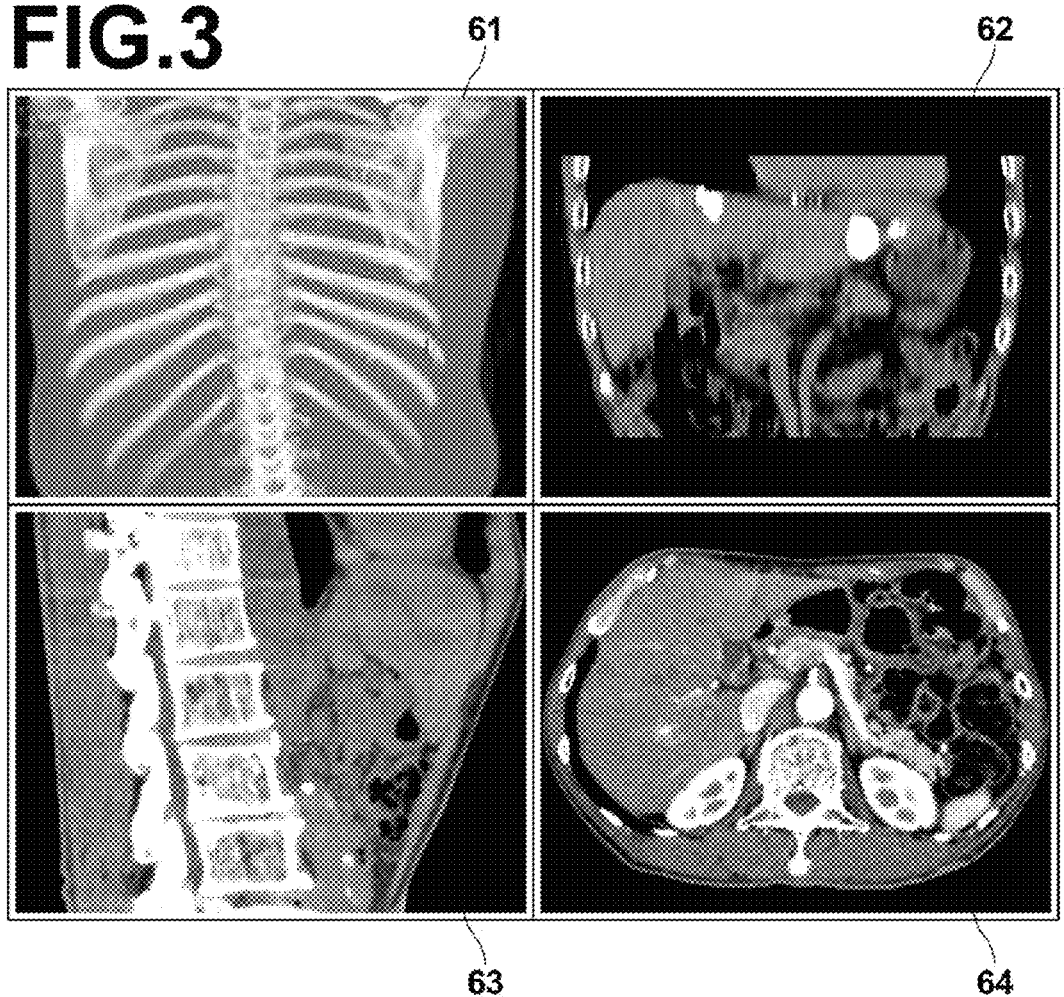
FIG. 3 shows an example of a display screen showing a plurality of display images.

Then, the image generation unit 53 loads the specified three-dimensional volume image V stored in the storage 33 into the memory 31, and generates one or more display images from the three-dimensional volume image V according to the instruction to display. The image generation unit 53 is capable of generating, for example, a coronal MIP image 61, which is a MIP (Maximum Intensity Projection) image with the projection plane thereof being a coronal plane, as well as a coronal image 62, a sagittal image 63 and an axial image 64, which are perpendicular to one another, as shown in FIG. 3. The coronal MIP image 61 is a projection image, which is MIP projected in the front-back direction of the human body, of regions in the rear half of the human body in the three-dimensional volume image V. Besides the above-described images, the image generation unit 53 is also capable of generating various images, such as a MinIP (Minimum Intensity Projection) image, a MPR (Multi-Planar Reconstruction) image, a SR (Surface-Rendering) image, a VR (Volume-Rendering) image, etc., from the three-dimensional volume image V.

Then, the display control unit 54 arranges the one or more display images generated by the image generation unit 53 on one display screen and displays the one or more display images on the display unit 35. FIG. 3 shows an example where four images including the coronal MIP image 61, the coronal image 62, the sagittal image 63, and the axial image 64 are arranged on one display screen.

Figure 4:
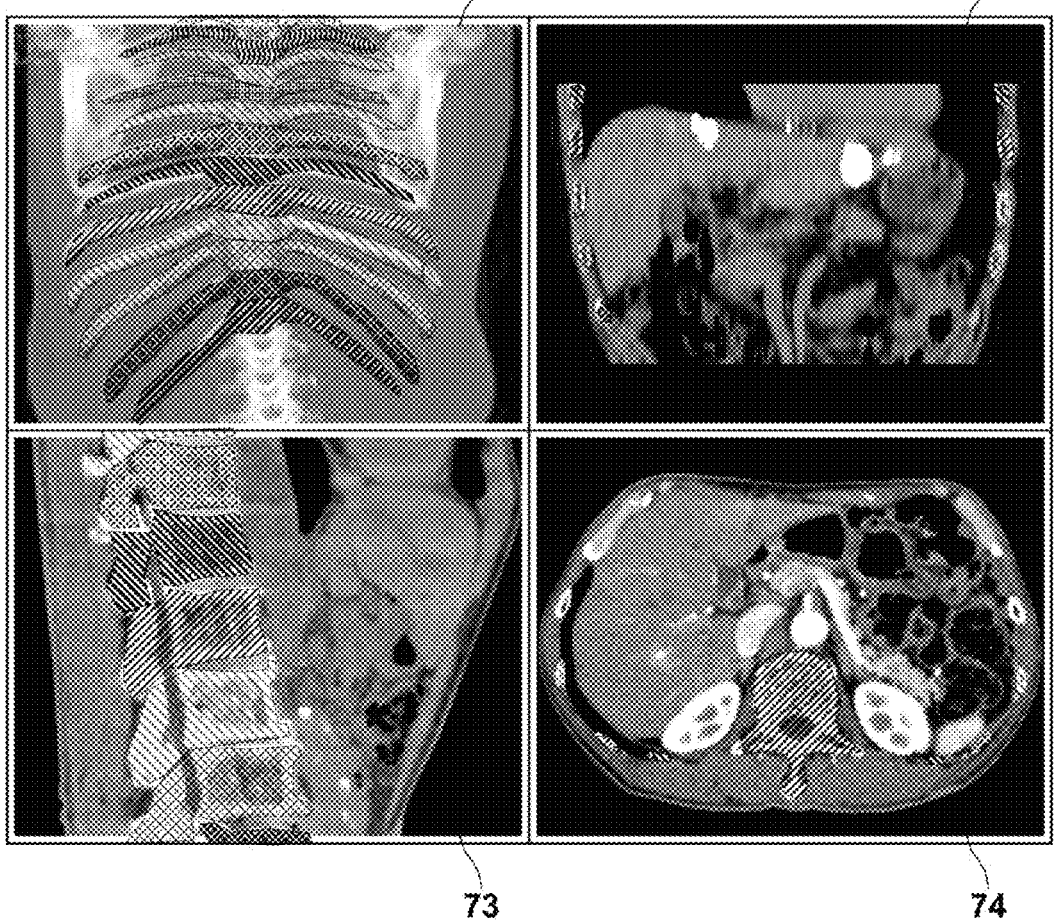
FIG. 4 shows an example of display of results of recognition of costal regions, etc., with respect to the display images shown in FIG. 3.

When a sub-menu is displayed and an item "display bone recognition" is selected via right click of the mouse by the operator on the display screen, for example, the image generation unit 53 further loads the labeling information L of the specified three-dimensional volume image V stored in the storage 33 into the memory 31, and generates one or more display images that show the results of recognition of costal regions, etc., based on the labeling information L. Then, the display control unit 54 arranges the thus generated display images on one display screen and displays the display images on the display unit 35. FIG. 4 shows an example of images showing the results of recognition of costal regions, etc., with respect to the images shown in FIG. 3.

As shown in a coronal MIP image 71, a coronal image 72, a sagittal image 73, and an axial image 74 shown in FIG. 4, the image generation unit 53 generates display images where different colors or patterns are applied to first partial regions that show different ones of the costal regions on one of right and left sides, and the same color or pattern as that of each first partial region is applied to the costal region provided with a label indicating a costal bone located on the opposite side of and paired with the first partial region. As shown in the coronal MIP image 71 and the axial image 74 shown in FIG. 4, the image generation unit 53 is also capable of generating a display image where the same color or pattern as that of each first partial region is applied to the vertebral region provided with a label indicating a vertebral bone connected to the costal bone shown by the first partial region.

Now, some specific examples of a method used by the image generation unit 53 to generate a display image showing the results of recognition of costal regions, etc., are described. The first example of the method involves: identifying a region in the three-dimensional volume image V rendered in each pixel of the display image; identifying a color (or pattern) corresponding to the label assigned to the identified region by referencing a table that defines correspondence relationships between labels and the colors (or patterns); determining a pixel value of the pixel using information of the identified color (or pattern); and arranging the thus determined pixel values of all the pixels to form a display image, whereby generating a display image showing the results of recognition of the costal regions, etc.

The second example of the method involves: preparing in advance a three-dimensional labeled image by assigning each pixel of the three-dimensional volume image V with a label indicating a region to which the pixel belongs; generating a base image, such as a tomographic image or a projection image, from the three-dimensional volume image V; generating, from the three-dimensional labeled image, a mask image of an image range corresponding to the base image; and superimposing the mask image on the base image to form a display image, whereby generating a display image showing the results of recognition of the costal regions, etc.

Further, in the case where a plurality of display images are generated from the three-dimensional volume image V and arranged on one display screen to be displayed, as shown in FIG. 4, the image generation unit 53 may apply the same color or pattern to corresponding partial regions in the plurality of display images showing a costal region or a vertebral region provided with the same label in the three-dimensional volume image V. This facilitates understanding positional relationships among the images.

In a case where the image generation unit 53 generates, as the display image, a projection image by projecting regions each having a thickness in the projection direction, the image generation unit 53 may appropriately limit the regions shown in the projection image such as, by MIP projecting, in the front-back direction of the human body, only the regions in the rear half of the human body in the three-dimensional volume image V, as shown in the coronal MIP image 71 shown in FIG. 4, so that there are no overlapping areas between bone regions shown in the display image. This facilitates understanding positions of the bone regions as a whole.

Figure 5:
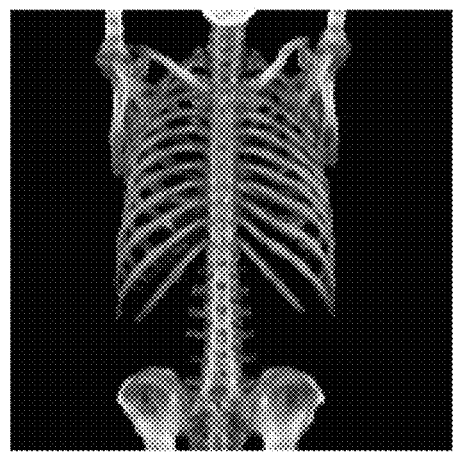
FIG. 5 shows an example of a display image.
Figure 6:
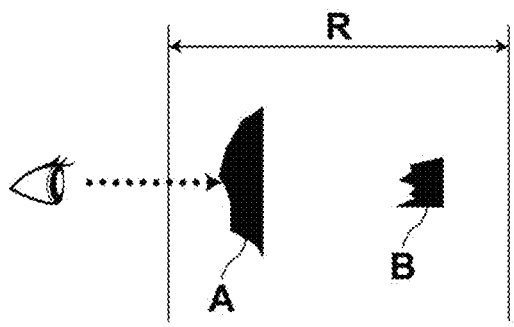
FIG. 6 is a diagram for explaining how colors or patterns are applied to bone regions that are projected with being overlapped.
Figure 7:
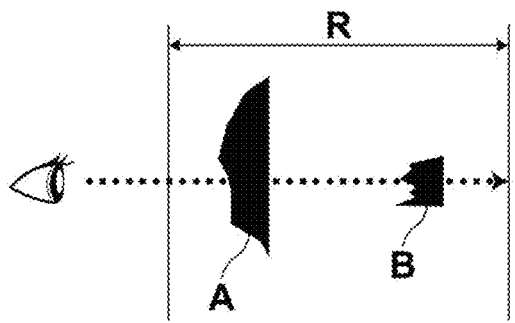
FIG. 7 is a diagram for explaining how colors or patterns are applied to bone regions that are displayed with being overlapped.
Figure 8:
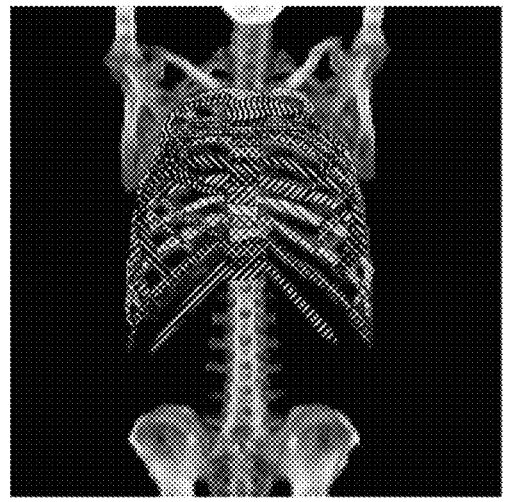
FIG. 8 shows an example of an image showing results of recognition of costal regions, etc., with respect to the image shown in FIG. 5.

On the other hand, a projection image including overlapping areas between bone regions can be generated as the display image, as shown in FIG. 5, for example. In this case, with respect to the overlapping areas between bone regions, such as bone regions A and B shown in FIG. 6, in the display image, the image generation unit 53 may apply, to the overlapping areas, the color or pattern applied to one of the bone regions A and B which is nearest to the view point (in this case, the bone region A). Alternatively, as shown in FIG. 7, the image generation unit 53 may apply, to the overlapping areas between the bone regions A and B, a color or pattern that is a weighted mixture of the colors or patterns applied to the bone regions A and B. FIG. 8 shows an example of an image showing the results of recognition of costal regions, etc., from the image shown in FIG. 5, where each overlapping area between bone regions is provided with a pattern that is a weighted mixture of the patterns applied to the bone regions.

Figure 9:
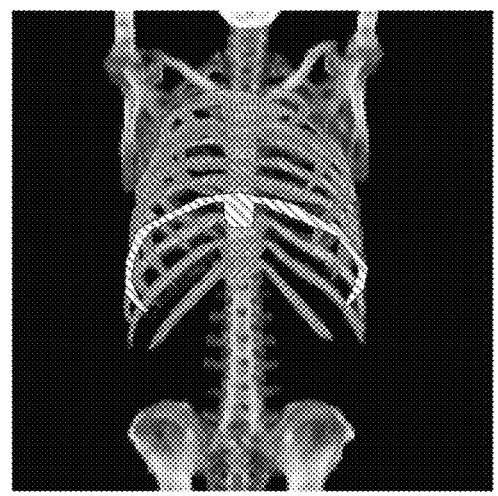
FIG. 9 shows an example of an image where bone regions selected on the image shown in FIG. 8 are highlighted.
Figure 10:
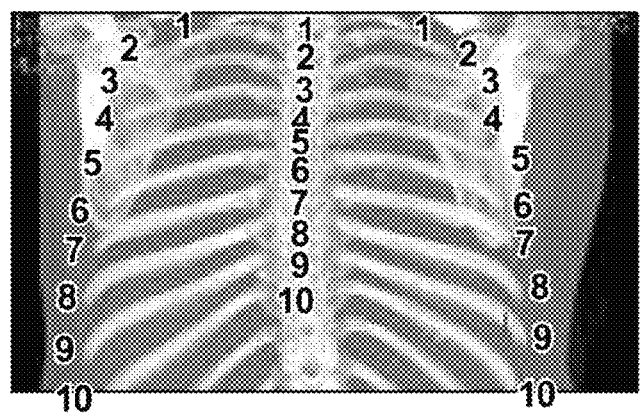
FIG. 10 shows an example of an image that is provided according to a prior art method in a case where there is no error in the results of recognition.
Figure 11:
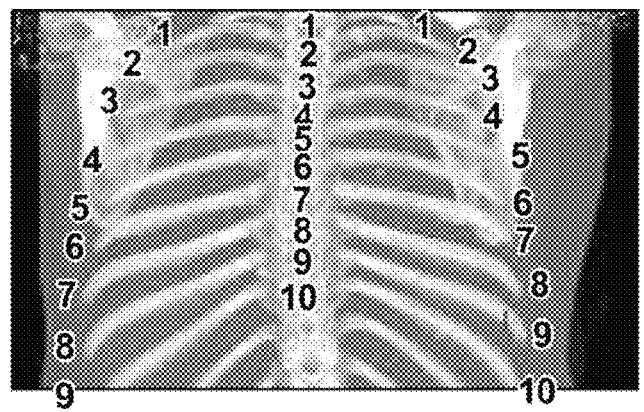
FIG. 11 shows an example of an image that is provided according to the prior art method in a case where there are errors in the results of recognition.
Figure 12:
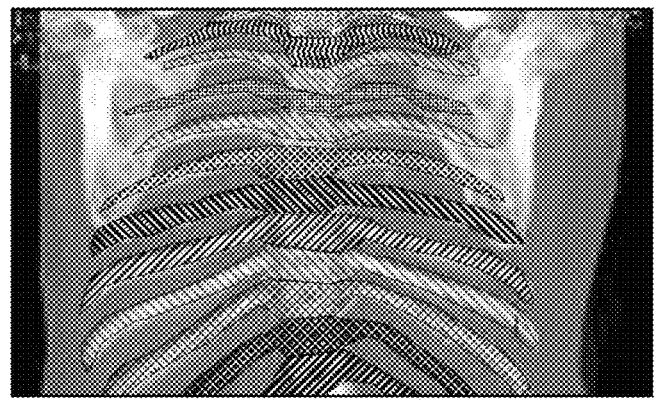
FIG. 12 shows an example of an image that is provided according to the invention in a case where there is no error in the results of recognition.
Figure 13:
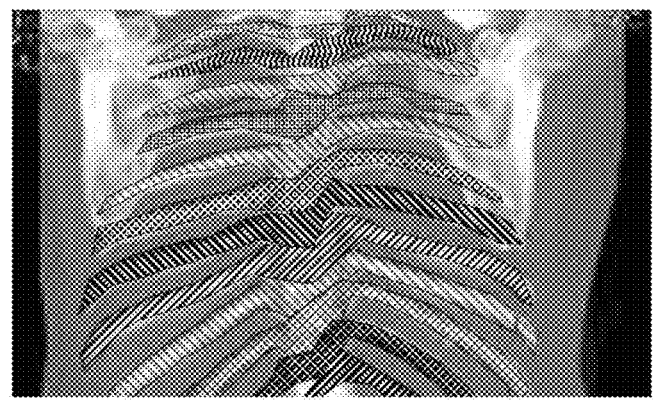
FIG. 13 shows an example of an image that is provided according to the invention in a case where there are errors in the results of recognition.

Further, in response to an operator's selection of a bone region with a color or pattern applied thereto on the display screen that shows the display image showing the results of recognition of costal regions, etc., which selection is made by clicking on one of the bone regions or simply keeping the pointer on the bone region, the image generation unit 53 is capable of generating a highlighted image where the color or pattern applied to the selected bone region is more highlighted than colors or patterns applied to the other bone regions, and the display control unit 54 is capable of displaying the generated highlighted image on the display unit 35. FIG. 9 shows an example of the highlighted image where the selected bone region in the image shown in FIG. 8 is highlighted. As shown in FIG. 9, the costal region paired with the selected bone region and the vertebral region connected to the selected bone region may also be highlighted.

Further, in response to input of an operator's instruction to sequentially change a displayed tomographic image among tomographic images that are sequential in an arbitrarily-set direction, which may be coronal images, sagittal images, axial images, etc., the image generation unit 53 is capable of generating a plurality of tomographic images to be displayed from the three-dimensional volume image V, and the display control unit 54 is capable of sequentially changing the image displayed on the display unit 35 among the thus generated tomographic images.

Further, in response to input of an operator's instruction to show the results of recognition of costal regions, etc., during the sequentially changed display of the tomographic images, the image generation unit 53 is capable of generating, as display images showing the results of recognition of costal regions, etc., a plurality of tomographic images from the three-dimensional volume image V, wherein the same color or pattern is applied to corresponding partial regions in the tomographic images showing a costal region or a vertebral region and provided with the same label, and wherein, in the tomographic images as a whole, different colors or patterns are applied to the first partial regions that show different ones of the costal regions on one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region, and the display control unit 54 is capable of sequentially changing the image displayed on the display unit 35 among the thus generated tomographic images.

According to the above-described configuration of the image processing system 10 of this embodiment, the image obtaining unit 51 obtains a three-dimensional volume image V obtained by imaging the chest of a human body; the information obtaining unit 52 obtains information L about costal regions on one of right and left sides of the human body, and costal regions on the other of the right and left sides or a plurality of vertebral regions of the human body in the three-dimensional volume image, the costal regions and the vertebral regions having been recognized and labeled in the three-dimensional volume image; the image generation unit 53 generates a display image from the three-dimensional volume image V using the obtained information L, the display image being a two-dimensional image including first partial regions that show at least a part of at least two of the costal regions on the one of the right and left sides, and second partial regions that show at least a part of at least two of the costal regions on the other of the right and left sides or at least two of the vertebral regions, wherein different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; and the display control unit 54 displays the generated display image on the display unit. The thus provided image facilitates determining if there is an error in the results of recognition of costal regions, etc.

Further, in the above-described embodiment, in the case where the image generation unit 53 generates, as the display image showing results of recognition of costal regions, etc., a projection image by MIP projecting regions in the rear half of the human body in the three-dimensional volume image V in the front-back direction of the human body, as shown in the coronal MIP image 71 shown in FIG. 4, and the display control unit 54 displays the projection image on the display unit 35, a person who interprets the image, such as a doctor, seeing the display image can understand, at a glance, the symmetry and the connection relationship of the regions provided with the same color or pattern in the display image, and this allows quickly and easily determining if there is an error in the results of recognition.

Although the above-described embodiment shows an example of the display image where the results of recognition of costal regions, etc., are shown by each of the recognized regions filled with a color or pattern, this is not intended to limit the invention. For example, at least a part of each recognized region may be filled with a color or pattern, such as thinning the region and filling only a center portion of the region resulting from the thinning with a color or pattern, or filling only a peripheral edge portion of the region with a color or pattern, so that the user seeing the display image can generally understand the position of the entire region according to the color or pattern.

Further, although the above-described embodiment shows an example where a plurality of display images are generated and displayed, one display image may be generated and displayed. For example, one of the coronal MIP image 71, the coronal image 72, and the axial image 74 shown in FIG. 4 may be generated and displayed as the display image.

Still further, although the above-described embodiment shows an example where a display image in which all the left and right costal regions and the vertebral regions are provided with colors or patterns is generated and displayed, a display image in which only the left and right costal regions are provided with colors or patterns, or only the costal regions on one of the right and left sides, and the vertebral regions are provided with colors or patterns may be generated and displayed.

Yet further, although the above-described embodiment shows an example of the display image where only colors or patterns are used to show the results of recognition of costal regions, etc., a display image where a character string representing the label assigned to each recognized bone region is shown in the vicinity of the bone region, in addition to the color or pattern applied to the bone region, may be generated and displayed.

What is claimed is:
1. An image display device comprising:
an image obtaining unit for obtaining a three-dimensional volume image obtained by imaging a chest of a human body;

an information obtaining unit for obtaining information about costal regions on one of right and left sides of the human body in the three-dimensional volume image, and costal regions on the other of the right and left sides of the human body or vertebral regions of the human body in the three-dimensional volume image, the costal regions and the vertebral regions having been recognized and labeled in the three-dimensional volume image;

an image generation unit for generating a display image from the three-dimensional volume image using the obtained information, the display image being a two-dimensional image including first partial regions that show at least a part of at least two of the costal regions on the one of the right and left sides, and second partial regions that show at least a part of at least two of the costal regions on the other of the right and left sides or at least two of the vertebral regions, wherein different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region;

a display unit for displaying an image; and a display control unit for displaying the generated display image on the display unit, wherein the image generation unit generates the display image that comprises a projection image generated by projecting regions in an arbitrarily-set projection direction in the three-dimensional volume image, each region having a thickness in the projection direction, wherein the colors or patterns are applied to the first and the second partial regions.

2. The image display device as claimed in claim 1, wherein the image generation unit generates the display image wherein the second partial regions include the second partial regions that show at least a part of at least two of the costal regions on the other of the right and left sides and the second partial regions that show at least a part of at least two of the vertebral regions, wherein the same color or pattern as that of each first partial region is applied to the second partial region that shows a costal region provided with a label indicating a costal bone located on the opposite side of and paired with the costal bone shown by the first partial region and the second partial region that shows a vertebral region provided with a label indicating a vertebral bone connected to the costal bone shown by the first partial region.

3. The image display device as claimed in claim 1, wherein the image generation unit performs, as an operation to apply the color or pattern to a specific region, one of filling the entire specific region with the color or pattern, filling only a center portion of the specific region resulting from thinning of the specific region with the color or pattern, and filling only a peripheral edge portion of the specific region with the color or pattern.

4. The image display device as claimed in claim 1, wherein the image generation unit generates the projection image by projecting, in the front-back direction of the human body, the regions in the rear half of the human body in the three-dimensional volume image.

5. The image display device as claimed in claim 1, wherein said display image comprises the first display image, and the image generation unit generates, in addition to the first display image, at least one second display image that comprises a two-dimensional image from the three-dimensional volume image, wherein, in both the at least one second display image and the first display image, the same color or pattern is applied to corresponding partial regions that show a costal region or a vertebral region provided with the same label in the three-dimensional volume image, and the display control unit displays the at least one second display image and the first display image on the display unit.

6. The image display device as claimed in claim 1, wherein, the image generation unit generates, using the obtained information, the display image wherein a character string representing the label assigned to each partial region is shown in the vicinity of corresponding one of the first and the second partial regions with the color or pattern applied thereto.

7. The image display device as claimed in claim 1, wherein, if the regions to be projected in the three-dimensional volume image include regions provided with labels and having an overlapping area therebetween when viewed in the projection direction, the image generation unit applies, to an area in the display image corresponding to the overlapping area, the color or pattern applied to the region nearest to a view point among the regions provided with labels and having the overlapping area therebetween.

8. The image display device as claimed in claim 1, wherein, if the regions to be projected in the three-dimensional volume image include regions provided with labels and having an overlapping area therebetween when viewed in the projection direction, the image generation unit applies, to an area in the display image corresponding to the overlapping area, a color or pattern that is a weighted mixture of the colors or patterns applied to the regions provided with labels and having the overlapping area therebetween.

9. The image display device as claimed in claim 1, wherein, in response to input of an operator's selection of one of the partial regions with the colors or patterns applied thereto in the display image displayed on the display unit, the image generation unit generates a highlighted image wherein the color or pattern applied to the selected partial region is more highlighted than the colors or patterns applied to the other partial regions, and the display control unit displays the thus generated highlighted image on the display unit.

10. The image display device as claimed in claim 1, wherein:

the image generation unit generates a plurality of tomographic images from the three-dimensional volume image, the tomographic images being sequential in an arbitrarily-set direction, wherein the same color or pattern is applied to corresponding partial regions that show a costal region or a vertebral region provided with the same label, the tomographic images as a whole includes first partial regions that show at least a part of at least two of the costal regions on the one of the right and left sides, and second partial regions that show at least a part of at least two of the costal regions on the other of the right and left sides or at least two of the vertebral regions, different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; and the display control unit sequentially changes a tomographic image displayed on the display unit among the generated tomographic images in response to input of an operator's instruction to sequentially change the displayed tomographic image.

11. An image display method performed by an image display device including an image obtaining unit, an information obtaining unit, an image generation unit, a display unit, and a display control unit, wherein:

the image obtaining unit obtains a three-dimensional volume image obtained by imaging a chest of a human body;

the information obtaining unit obtains information about costal regions on one of right and left sides of the human body in the three-dimensional volume image, and costal regions on the other of the right and left sides of the human body or vertebral regions of the human body in the three-dimensional volume image, the costal regions and the vertebral regions having been recognized and labeled in the three-dimensional volume image;

the image generation unit generates a display image from the three-dimensional volume image using the obtained information, the display image being a two-dimensional image including first partial regions that show at least a part of at least two of the costal regions on the one of the right and left sides, and second partial regions that show at least a part of at least two of the costal regions on the other of the right and left sides or at least two of the vertebral regions, wherein different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; and the display control unit displays the generated display image on the display unit, wherein the image generation unit generates the display image that comprises a projection image generated by projecting regions in an arbitrarily-set projection direction in the three-dimensional volume image, each region having a thickness in the projection direction, wherein the colors or patterns are applied to the first and the second partial regions.

12. The image display method as claimed in claim 11, wherein:

the image generation unit generates a plurality of tomographic images from the three-dimensional volume image, the tomographic images being sequential in an arbitrarily-set direction, wherein the same color or pattern is applied to corresponding partial regions that show a costal region or a vertebral region provided with the same label, the tomographic images as a whole includes first partial regions that show at least a part of at least two of the costal regions on the one of the right and left sides, and second partial regions that show at least a part of at least two of the costal regions on the other of the right and left sides or at least two of the vertebral regions, different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; and the display control unit sequentially changes a tomographic image displayed on the display unit among the generated tomographic images in response to input of an operator's instruction to sequentially change the displayed tomographic image.

13. A non-transitory computer-readable recording medium containing an image display program for causing a computer to function as:

an image obtaining unit for obtaining a three-dimensional volume image obtained by imaging a chest of a human body;

an information obtaining unit for obtaining information about costal regions on one of right and left sides of the human body in the three-dimensional volume image, and costal regions on the other of the right and left sides of the human body or vertebral regions of the human body in the three-dimensional volume image, the costal regions and the vertebral regions having been recognized and labeled in the three-dimensional volume image;

an image generation unit for generating a display image from the three-dimensional volume image using the obtained information, the display image being a two-dimensional image including first partial regions that show at least a part of at least two of the costal regions on the one of the right and left sides, and second partial regions that show at least a part of at least two of the costal regions on the other of the right and left sides or at least two of the vertebral regions, wherein different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region;

a display unit for displaying an image; and a display control unit for displaying the generated display image on the display unit, wherein the image generation unit generates the display image that comprises a projection image generated by projecting regions in an arbitrarily-set projection direction in the three-dimensional volume image, each region having a thickness in the projection direction, wherein the colors or patterns are applied to the first and the second partial regions.

14. The recording medium as claimed in claim 13, wherein:

the image generation unit generates a plurality of tomographic images from the three-dimensional volume image, the tomographic images being sequential in an arbitrarily-set direction, wherein the same color or pattern is applied to corresponding partial regions that show a costal region or a vertebral region provided with the same label, the tomographic images as a whole includes first partial regions that show at least a part of at least two of the costal regions on the one of the right and left sides, and second partial regions that show at least a part of at least two of the costal regions on the other of the right and left sides or at least two of the vertebral regions, different colors or patterns are applied to the first partial regions that show different ones of the costal regions on the one of the right and left sides, and the same color or pattern as that of each first partial region is applied to the second partial region that shows a costal region provided with a label indicating a costal bone located on the opposite side of and paired with the costal bone shown by the first partial region or a vertebral region provided with a label indicating a vertebral bone connected to the costal bone shown by the first partial region; and the display control unit sequentially changes a tomographic image displayed on the display unit among the generated tomographic images in response to input of an operator's instruction to sequentially change the displayed tomographic image.

* * * * *